June 13, 1967          H. L. HONN          3,324,636
ROW-FOLLOWING PLANT LIFTER
Filed Nov. 30, 1964
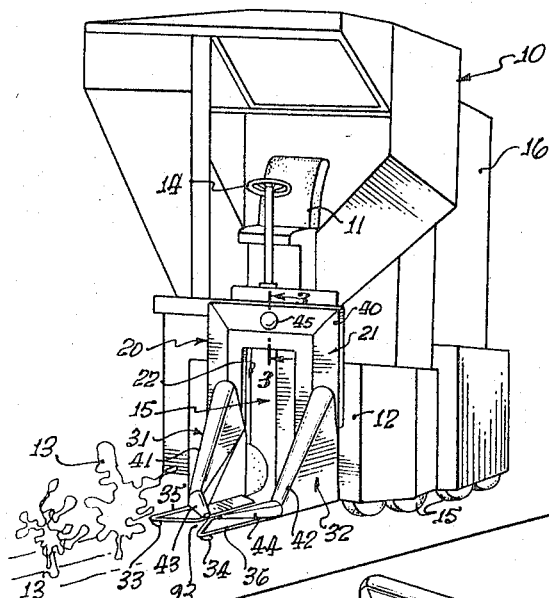
INVENTOR.
HAROLD L. HONN,
By Edmond F. Shanahan
ATTORNEY.

United States Patent Office 3,324,636
Patented June 13, 1967

3,324,636
ROW-FOLLOWING PLANT LIFTER
Harold L. Honn, 3064 Elmwood Ave.,
Bakersfield, Calif. 93305
Filed Nov. 30, 1964, Ser. No. 414,522
8 Claims. (Cl. 56—11)

The invention relates to accessories used on the front of cotton pickers or similar agricultural machines for following a row of plants and for guiding the plants into the picking device. More particularly, the invention relates to a row-following plant-lifter which combines lateral row-following movement by means of a pendulum suspension, with vertical ground-following movement of independently suspended right and left side collection pans.

Cotton picking machines are designed to be driven over level ground surface and down a perfectly straight row of plants. As the machine moves down the row, steered by an operator seated high above the forward end, the cotton plants are received into the mouth of the machine, and, preferably, all branches carrying cotton are lifted upwardly and stripped of the cotton bolls. Unfortunately, the ideal operation has proven impossible for cotton picking machines heretofore devised. Consequently, substantial amounts of cotton are spoiled and missed, and the machines sometimes take in rocks which damage the picking mechanism.

Heretofore, there has been a certain amount of wandering of the cotton picker machine with respect to the row of cotton plants regardless of the efforts of the human operator. No matter how diligent the operator may be at first, fatigue eventually reduces his accuracy in steering, and he will involuntarily wander slightly first to one side of the row and then to the other. Also, no matter how accurately he may steer, he cannot always accommodate the slight variations in the row of plants since their stalks are concealed beneath their foliage, and may not have been planted, or have grown, in a perfectly straight line.

Another difficulty in row-following has been that irregularities in the ground surface may cause the machine to wander slightly regardless of straightness of the row, or accuracy in the operator's steering.

Irregularity in the ground surface has the additional disadvantage that the operator is constantly confronted with the problem of adjusting the elevation of the picker head in order to scavenge the lowest cotton on the plant, without driving the machine into the ground surface. In some recent devices, this difficulty has been overcome for many applications, by providing automatic elevation control of the picker head, so as to relieve the operator of this task. Even this improvement, however, makes no allowance for possible differences in elevation on opposite sides of the picker head, and in addition requires the massive adjustment of the heavy picker head for each change in ground elevation. In some applications, it will be found advantageous to employ the present invention, which is adapted to follow the row and adjust to minor differences in ground surface, in combination with one of the automatic picker head elevation devices.

It is the major object of the present invention to provide an intake means which may be movably mounted on the front of the cotton picker head and which has the ability to follow the row of plants regardless of a limited amount of deviation between the line of the plant row, and the line of travel of the cotton picker.

It is a second major object of the present invention to provide such a row-following intake device, in which a pair of forwardly-extending sides or collection pans are adapted to be vertically movable, and have the capacity to resiliently follow the ground surface, independently of each other.

It is another major object of the invention to provide a row-following plant lifter which tends to reject rocks and clods and to prevent them from being swept into the picking machine.

The construction and operation of the invention will be understood from a reading of the following description of one preferred embodiment, which is illustrated in the accompanying drawings, in which:

FIGURE 1 is a perspective view from the right front side of a row-following plant lifter constructed according to the invention, and mounted on the front of a cotton picker as it moves along a row of cotton plants;

FIGURE 2 is an enlarged perspective view of the plant lifter in disassembly, with housing parts removed or broken away so as to reveal its component parts;

FIGURE 3 is a sectional detail view of the pivot means from which the plant follower assembly is suspended;

FIGURE 4 is a front elevational view of the side plates over which the main plant lifting assembly swings laterally on side rollers;

FIGURE 5 is a sectional detail view of one of the side rollers, as viewed at the plane 5—5 indicated by arrows in FIGURE 4; and FIGURE 6 is a perspective view of the housing and nose cone from the right side assembly of the plant lifter.

FIGURE 1 of the drawings shows a simplified perspective sketch of a cotton picker 10 with a row-following plant lifter 20, constructed according to the invention, mounted on the front of the machine.

The details of construction of cotton picker 10 are not relevant to a description of the invention and its operation; indeed, the device 10 need not be a cotton picker, but may be any similar type of row-following picking machine. A cotton picker has been chosen as the best and most typical application presently known for the plant lifter 20.

The person driving the cotton picker 10 occupies a driver's seat 11 mounted high over the forward end 12 of cotton picker 10, where he steers the machine along a row of cotton plants 13 by means of a steering wheel 14. The cotton picker 10 is driven by its own power plant, and moves along on wheels 15.

As the cotton picker 10 moves down the row of cotton plants 13, it receives these plants into a vertical slotted forward opening 15, back of which a picking mechanism, not illustrated, and not a part of this invention, strips the cotton from the plants and carries it back and up into the main body 16 of the machine, where the cotton separation to be accomplished by the cotton picker 10 is completed.

A comparison of the general view of FIGURE 1, and the exploded assembly of FIGURE 2, reveals that the plant lifter 20 is comprised primarily of an assembly carried on a yoke 21, which swings laterally on a mounting to a mounting plate 22, which ladder is bolted to the front 12 of the cotton picker by means of bolts 23, and is disposed around the picker opening 15.

The upper center of the yoke 21 is pierced by a bore 24 which rotatably receives a fulcrum pin assembly 25 (seen in section in FIGURE 3) which is comprised of a large bolt 26, which is welded to the upper center of mounting plate 22, a bearing sleeve 27, a spacer 28, and a retaining assembly 30 comprised of washer, nut, and cotter pin.

The laterally swinging yoke 21 carries a pair of independently suspended, vertically movable, row-side follower assemblies 31 and 32, mounted on the right and left sides, respectively, of the yoke 21. Each of these assemblies is resiliently guided over the ground by one of a pair of ground-follower skids 33 and 34, which are preferably resilient steel members carried in a trailing position well forward of the main portions of the follower assemblies 31 and 32 by open bar structures 35 and 36.

Preferably, the principal parts of the plant lifter 20 are covered and protected by sheet-metal housing elements, including a peripheral shell 40 welded around the upper portion of yoke 21, right and left side housings 41 and 42 on each of the side assemblies 31 and 32, right and left nose cones 43 and 44, respectively, on the forward ends of each of the side assemblies 31 and 32, and a small dome-shaped cover 45 fastened over the fulcrum pin assembly 25 by attachment to the face of the yoke 21.

Of course, as the cotton picker 10 moves forward, the dragging of skids 33 and 34 on the ground impart a backward thrust on the depending lower arm portions 21a and 21b of yoke 21 through the follower assemblies 31 and 32. The yoke arms 21a and 21b are therefore provided with laterally projecting thrust plates 51 and 52, which ride on obliquely disposed side rollers 53 and 54 which are mounted on the face of mounting plate 22, as seen in the detail views of FIGURES 4 and 5. These rollers are disposed with their axes passing through the axes of fulcrum pin assembly 25 to provide for smooth lateral swinging of the yoke 21 as it is defected from side to side by relative deviations between the direction of travel of the cotton picker 10 and the line of the row of cotton plants 13.

The manner in which each of the independently suspended row-side follower assemblies 31 and 32 resiliently rise and fall with the rise and fall of the ground surface is best illustrated in FIGURE 2, in which various parts of the side housings 41 and 42 have been removed to reveal the components of these assemblies.

The sheet-metal structure of the side housings and nose cones are illustrated in perspective for right side housing 41 and right nose cone 43 in FIGURE 6.

It will be seen that the left side assembly 32 (and right side assembly 31 is identical in construction, but with right-side disposition of parts) is comprised of a flat, forwardly extending collector pan 62, which is hingeably mounted to the lower end of yoke arm 21b by means of a long hinge 64 journaled at each end at 64a and 64b in a channel-shaped bracket 65.

Preferably, the hinge suspension of collector pan 62 is of a parallelogram linkage type so that the pan 62 undergoes substantially vetrical movement as it rides over ground surface irregularities. Thus, in the preferred embodiment illustrated in the drawings, the pan 62 is provided with a vertically-projecting bearing support 66, which is connected to the yoke bearing support member 65 by upper and lower links 67 and 68. Upper link 67 is pin connected to the supports 66 and 65, respectively, by pins 67a and 67b. Roller link 68 is preferably of a tapering channel construction as seen in FIGURE 2 and in the sectional view of FIGURE 4, and is rotatably connected to supports 65 and 66, respectively, by the hinge pine 64b (already described) and the hinge pin 69.

It will be seen that the above described linkage structure presents substantial lateral rigidity, because of the width of lower link 68 and its long hinge mountings by pins 64b and 69. At the same time, substantially vertical up and down movement of collector pan 62 is produced by the movement of links 67 and 68.

The collector pan 62, and the entire row-side follower assembly 32 are resiliently carried by a helical spring 70, which is anchored to left yoke arm 21b at its upper end by anchor 71 and yoke anchor brackets 72, while its lower end is slidably anchored by a hook 73 received on an anchor track 74 on collector pan 62. The spring tension of spring 70 is adjusted so that it provides almost, but not quite, total support for the follower assembly 32. Thus, only a minimum of ground pressure is pressure on skid 34 is required to cause the entire assembly 32 to rise. On the other hand, the spring tension is not so great as to prevent skid 34 from following depressions. However, it is desirable to prevent the skid 34 from leading the assembly 32 into an earth-gouging position, because of a hole, rather than a declining slope. Consequently, a limiting chain 80, anchored between the yoke 21 at 81 and the collector pan 62 at 82 is provided to limit the drop of assembly 32 to a lowest safe position.

Preferably, both left collector pan 62 and right collector pan 62b are provided with adjustable plant guide bars 91 and 92, respectively, by means of which the width of the slot opening 93 between them be adjusted. Slotted openings 94 and attachment bolts 95 permit such adjustable attachment to the collector pans 62 and 62b. The adjustment so provided makes it possible to adjust the opening of slot 93 to the most efficient width for plants of a particular size. The opening should be wide enough to receive the trunk of the largest plants, but narrow enough to prevent the unwanted loss of cotton by the downward deflection of the lower branches on some plants.

It will be seen from the foregoing description that my invention provides a new and effective means for precise reception of the cotton plant (or other plant) into the cotton-picking opening 15. On many types of ground surface, adjustment in the elevation of the relatively massive picking head may be avoided, and the plant lifter of the present invention can be relied upon to follow minor changes in ground elevation, and to collect the lower branches of the plant, raising them to a picker head elevation that might otherwise be too high. In other applications, a combination of the present device with continuous adjustment in the elevation of the picker head will achieve efficiency not heretofore, possible, and will accomplish this with fewer adjustments in elevation of the picker head.

It will be seen that the pendulum suspension of the plant lifter permits it to wander laterally to follow the row of plants (within reasonable limits of steering) while simultaneously following the ground surface with independent right and left side followers. This combination is an essential feature to the best operation of the plant lifter in its preferred form. Plants are usually positioned along the top of a slight ridge which is in alignment with the row of plants. Lateral movement of the plant lifter to follow the row of plant stalks frequently causes it to encounter ground surface in the form of a transverse grade, with one side several inches higher than the other side. Efficient picking can only be accomplished, therefore, if the independent right and left side suspensions are combined with the lateral adjustability.

Another important advantage of the present invention, in its preferred embodiment illustrated in the drawings, is its ability to reject rocks and clods, or at least to intercept and hold them on collector pans 62 and 62b between housings 41 and 42, and thus prevent them from entering and damaging the picking mechanism of the picker 10. Accumulated rocks and clods are easily visible to the operator, as he looks down from seat 14. If he sees any dangerous accumulation of large rocks and clods, he can stop the machine and unload the accumulation from collector pans 62 and 62b. Ordinarily, however, it will be found that the open bar structure of 35 and 36, and the deflecting leading surface 96, seen on the forward edge of pan 62 (with similar construction not visible on pan 62b) will aid in connection with the nose cones 43 and 44, and the housings 41 and 42, in deflecting to the sides most of the rocks and clods encountered by the skids 33 and 34.

While I have described a preferred specific embodiment of my invention, it will be understood that it can be constructed in many forms and with many modifications without departing from the spirit of the invention. Also, the row-following plant lifter of the invention may be elaborated into more complex forms which incorporate the invention, or may be combined with complex automatic devices, which merely add to the invention without eliminating its employment. It is, therefore, my intention to comprehend within the scope of this patent not only the embodiment described in the foregoing specification

What is claimed is:

1. On a picking machine of the type which moves along a row of plants and receives each successive plant through a front opening, a row-following plant-lifter which includes:
   a laterally movable yoke suspended in front of said opening;
   a pair of collector pans projecting forwardly from said yoke and hingeably mounted thereon, and defining between them a slot for the reception and guidance of plants into said front opening of said picking machine;
   resilient spring support means for supporting said collector pans in a forwardly projecting position at a predetermined elevation;
   and a pair of skid means mounted at the forward ends of said collector pans to impart ground-following contact between said collector pans and surface irregularities of the ground.

2. On a picking machine of the type which moves along a row of plants and receives each successive plant through a front opening, a row-following plant-lifter which includes:
   a pendulum suspension means above said opening;
   a laterally swinging yoke rotatably suspended at said pendulum suspension means;
   a pair of collector means projecting forwardly from said yoke and defining between them a slot for the reception and guidance of plants into said front opening of said picking machine;
   a pair of hinged suspension means for movably suspending said collector means from said yoke, to permit upward movement of said pans independently of each other;
   resilient spring support means for supporting said collector means in a forwardly projecting position at a predetermined elevation;
   and a pair of resilient skid means located at the forward ends of said collector means, to impart ground-following contact between said collector means and surface irregularities of the ground.

3. On a picking machine of the type which moves along a row of plants and receives each successive plant through a front opening, a row-following plant-lifter which includes:
   a pendulum suspension means above said opening;
   a laterally swinging yoke rotatably suspended at said pendulum suspension means;
   a pair of collector means projecting forwardly from said yoke and defining between them a slot for the reception and guidance of plants into said front opening of said picking machine;
   a pair of hinged suspension means for movably suspending said collector means from said yoke, to permit upward movement of said means independently of each other;
   resilient spring support means for supporting said collector means in a forwardly projecting position at a predetermined elevation;
   streamlined housing means enclosing said right and left suspension means and providing smoothly contoured surfaces for the smooth uninterrupted guidance of plant branches from the forward openings of said slot to the front openings of said picker machine;
   and a pair of resilient skid means located at the forward ends of said collector means, to impart ground-following contact between said collector means and surface irregularities of the ground.

4. On a picking machine of the type which moves along a row of plants and receives each successive plant through a front opening, a row-following plant-lifter which includes:
   a pendulum suspension means above said opening;
   a laterally swinging yoke rotatably suspended at said pendulum suspension means;
   a pair of collector means including pans projecting forwardly from said yoke and defining between them a slot for the reception and guidance of plants into said front opening of said picking machine;
   a pair of hinged suspension means for movably suspending said collector means from said yoke, to permit upward movement of said pans independently of each other;
   resilient spring support means for supporting said collector means in a forwardly projecting position at a predetermined elevation;
   a pair of guide bars adjustably mounted, one on each of said collector pans, along said plant-reception slot between said pans, for adjusting the transverse width of the plant-reception slot;
   streamlined housing means enclosing said right and left suspension means and providing smoothly contoured surfaces for the smooth uninterrupted guidance of plant branches from the forward openings of said slot to the front opening of said picker machine;
   and a pair of resilient skid means trailing backwardly and downwardly from the forward ends of said collector means, to impart ground-following contact between said collector means and surface irregularities of the ground.

5. On a picking machine of the type which moves along a row of plants and receives each successive plant through a front opening, a row-following plant-lifter which includes:
   a pendulum suspension means above said opening;
   a laterally swinging yoke rotatably suspended at said pendulum suspension means;
   a pair of collector means projecting forwardly from said yoke and defining between them a slot for the reception and guidance of plants into said front opening of said picking machine;
   a pair of hinged suspension means for movably suspending said collector means from said yoke, to permit upward movement of said pans independently of each other;
   resilient spring support means for supporting said collector means in a forwardly projecting position at a predetermined elevation;
   a pair of roller means between said yoke and said picking machine to permit lateral pendulum movements of said yoke;
   and a pair of resilient skid means located at the forward ends of said collector means, to impart ground-following contact between said collector means and surface irregularities of the ground.

6. On a cotton-picking machine of the type which moves along a row of plants and receives each successive plant through a front opening, a row-following plant-lifter which includes:
   a mounting plate for mounting on said machine at said front opening, and comprising a pendulum suspension means above said opening;
   a laterally swinging yoke rotatably suspended at said pendulum suspension means;
   a pair of collector pans projecting forwardly from said yoke and defining between them a slot for the reception and guidance of plants into said front opening of said picking machine;
   a pair of hinged suspension means for movably suspending said collector pans from said yoke, each of said suspension means comprising upper and lower links with pin connections at each end to said yoke and one of said collection pans to permit substantially vertical movement of said pans independently of each other;
   resilient spring support means for supporting said collector pans in a forwardly projecting position at a predetermined elevation;

and skid means associated with the forward ends of said collection pans to impart independent ground-following movement to said pans.

7. On a cotton-picking machine of the type which moves along a row of plants and receives each successive plant through a front opening, a row-following plant-lifter which includes:

a mounting plate for mounting on said machine at said front opening, and comprising a pendulum suspension means above said opening and a pair of thrust rollers, one on each side of said opening with their rotational axes passing through the axis of said pendulum suspension means;

a laterally swinging yoke rotatably suspended at said pendulum suspension means and having thrust plate portions in lateral disposition at each side of said yoke for riding on said thrust rollers as said yoke makes lateral pendulum movements;

a pair of collector pans projecting forwardly from said yoke and defining between them a slot for the reception and guidance of plants into said front opening of said picking machine;

a pair of hinged suspension means for movably suspending said collector pans from said yoke, each of said suspension means comprising upper and lower links with pin connections at each end to said yoke and one of said collection pans to permit substantially vertical movement of said pans independently of each other;

resilient spring support means for supporting said collector pans in a forwardly projecting position at a predetermined elevation;

streamlined housing means enclosing said right and left suspension means and providing smoothly contoured surfaces for the smooth uninterrupted guidance of plant branches from the forward openings of said slot to the front opening of said picker machine;

open bar skid support structures projecting forwardly from each of said collector pans and providing between them a converging opening toward the entrance to said plant-reception slot;

and a pair of resilient skid means trailing backwardly and downwardly from the forward ends of said skid-support structures, to impart ground-following contact between said collection pans and surface irregularities of the ground.

8. On a cotton-picking machine of the type which moves along a row of plants and receives each successive plant through a front opening, a row-following plant-lifter which includes:

a mounting plate for mounting on said machine at said front opening, and comprising a pendulum suspension means above said opening and a pair of thrust rollers, one on each side of said opening with their rotational axes passing through the axis of said pendulum suspension means;

a laterally swinging yoke rotatably suspended at said pendulum suspension means and having thrust plate portions in lateral disposition at each side of said yoke for riding on said thrust rollers as said yoke makes lateral pendulum movements;

a pair of collector pans projecting forwardly from said yoke and defining between them a slot for the reception and guidance of plants into said front opening of said picking machine;

a pair of hinged suspension means for movably suspending said collector pans from said yoke, each of said suspension means comprising upper and lower links with pin connections at each end of said yoke and one of said collection pans to permit substantially vertical movement of said pans independently of each other;

resilient spring support means for supporting said collection pans in a forwardly projecting position at a predetermined elevation;

limit support means augmenting said resilient spring means and limiting the range of vertical movement of said collector pans;

a pair of guide bars adjustably mounted, one on each of said collector pans, along said plant-reception slot between said pans, for adjusting the transverse width of the plant-reception slot;

streamlined housing means enclosing said right and left suspension means and providing smoothly contoured surfaces for the smooth uninterrupted guidance of plant branches from the forward openings of said slot to the front opening of said picker machine;

open bar skid support structures projecting forwardly from each of said collector pans and providing between them a converging opening toward the entrance to said plant-reception slot;

and a pair of resilient skid means trailing backwardly and downwardly from the forward ends of said skid-support structures, to impart ground-following contact between said collection pans and surface irregularities of the ground.

References Cited

UNITED STATES PATENTS

| | | | |
|---|---|---|---|
| 2,388,454 | 11/1945 | Weeth et al. | 56—33 |
| 2,835,095 | 5/1958 | Self | 56—33 |

ABRAHAM G. STONE, *Primary Examiner.*

RUSSELL R. KINSEY, *Examiner.*